US009170929B2

(12) United States Patent
Kikkawa et al.

(10) Patent No.: US 9,170,929 B2
(45) Date of Patent: Oct. 27, 2015

(54) MEMORY CONTROLLER

(75) Inventors: Koji Kikkawa, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 13/982,409

(22) PCT Filed: Jan. 31, 2011

(86) PCT No.: PCT/JP2011/051960
§ 371 (c)(1),
(2), (4) Date: Jul. 29, 2013

(87) PCT Pub. No.: WO2012/104975
PCT Pub. Date: Aug. 9, 2012

(65) Prior Publication Data
US 2013/0311744 A1 Nov. 21, 2013

(51) Int. Cl.
*G06F 12/06* (2006.01)
*G06F 12/02* (2006.01)
*G06F 3/06* (2006.01)

(52) U.S. Cl.
CPC .............. *G06F 12/023* (2013.01); *G06F 3/061* (2013.01); *G06F 3/0643* (2013.01); *G06F 3/0679* (2013.01); *G06F 12/0246* (2013.01); *G06F 2212/1044* (2013.01); *G06F 2212/1048* (2013.01); *G06F 2212/7201* (2013.01)

(58) Field of Classification Search
CPC .............................. G06F 12/023; G06F 3/0679
See application file for complete search history.

(56) References Cited

U.S. PATENT DOCUMENTS

| 5,761,508 A * | 6/1998 | Okuno .......................... 717/100 |
| 6,377,500 B1 | 4/2002 | Fujimoto et al. |
| 8,280,927 B2 * | 10/2012 | Ueno ............................ 707/816 |
| 2003/0163630 A1 | 8/2003 | Aasheim et al. |
| 2006/0039221 A1 * | 2/2006 | Fukuda ......................... 365/222 |

(Continued)

FOREIGN PATENT DOCUMENTS

| JP | 2001-142774 A | 5/2001 |
| JP | 2006-040264 A | 2/2006 |

(Continued)

OTHER PUBLICATIONS

Extended European Search Report dated Jul. 7, 2014 in the corresponding EP Application No. 11857752.7.
International Search Report of the International Searching Authority mailed Feb. 22, 2011 for the corresponding international application No. PCT/JP2011/051960 (with English translation).

*Primary Examiner* — Idriss N Alrobaye
*Assistant Examiner* — Ronald Modo
(74) *Attorney, Agent, or Firm* — Posz Law Group, PLC

(57) ABSTRACT

A data storage temporarily stores an address conversion table associating the sector numbers with the physical addresses for each file. A conversion table memory allocator allocates a memory region for the address conversion table corresponding to a file when a request is made to open the file. A file system manager releases the allocated memory region at a given time. The file system manager stores sector numbers of one or multiple sectors constituting a file in each record of the address conversion table for which the memory region is allocated in sequence. Then, a memory control section searches the flash memory to acquire a physical address corresponding to a sector number in the each record of the address conversion table, and stores each acquired physical address in the corresponding record.

8 Claims, 7 Drawing Sheets

(56) References Cited

U.S. PATENT DOCUMENTS

2007/0300037 A1    12/2007    Rogers et al.
2008/0320211 A1    12/2008    Kinoshita
2010/0169551 A1    7/2010    Yano et al.

FOREIGN PATENT DOCUMENTS

| | | |
|---|---|---|
| JP | 2009-003783 A | 1/2009 |
| JP | 2010-157141 A | 7/2010 |
| WO | 2005/124530 A2 | 12/2005 |

* cited by examiner

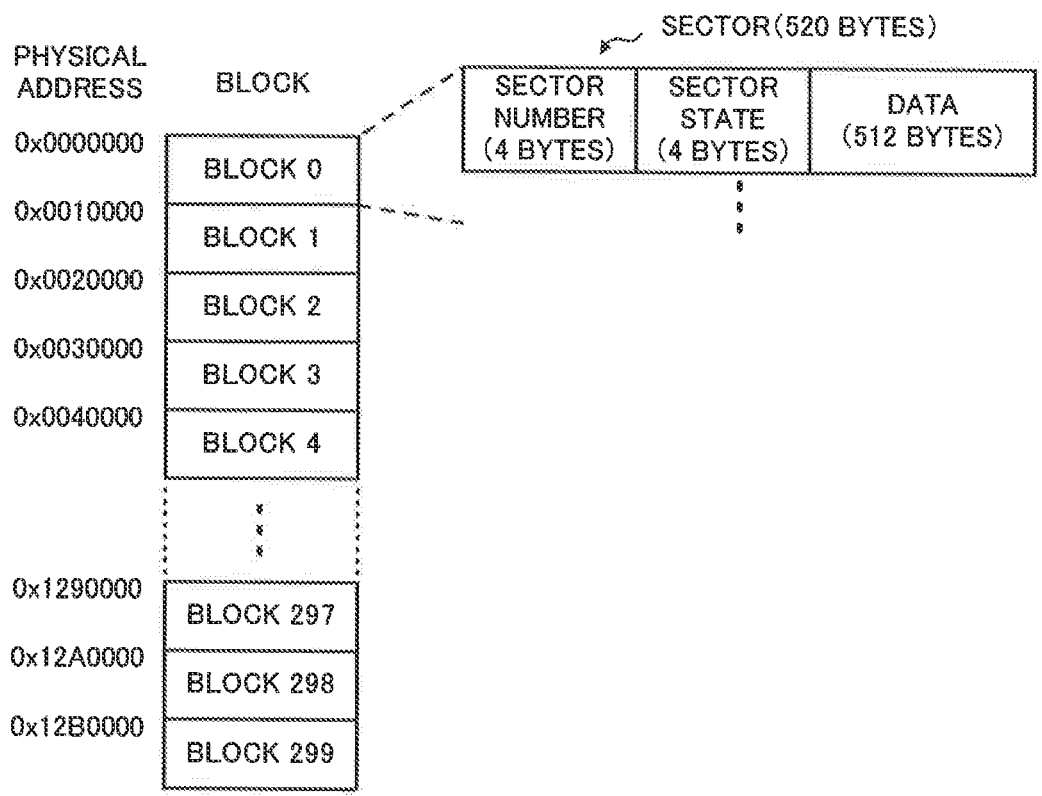

FIG.5

| CONVERSION TABLE MANAGEMENT TABLE | | | 132 |
|---|---|---|---|
| FILE NAME | FIRST ADDRESS | NUMBER OF RECORDS | |
| "ABC.DAT" | ... | ... | |
| "XYZ.DAT" | ... | ... | |

FIG.6

| ADDRESS CONVERSION TABLE | | 133 |
|---|---|---|
| SECTOR NUMBER | PHYSICAL ADDRESS | |
| 21 | 0x0000208 | |
| 22 | 0x0030410 | |
| ⋮ | ⋮ | |
| 1020 | 0x12B0000 | |

FIG.10

| FILE SYSTEM DEFINITION TABLE | ~131 |
|---|---|
| START ADDRESS | 0x0000000 |
| START SECTOR | 1 |
| DRIVE SIZE | 19.2 MB |
| NUMBER OF OPEN RESERVATIONS | 8 |
| RESERVATION SIZE | 60 B |

MEMORY CONTROLLER

CROSS REFERENCE TO RELATED APPLICATION

This application is a U.S. national stage application of PCT/JP2011/051960 filed on Jan. 30, 2011.

TECHNICAL FIELD

The present invention relates to a technique of accessing a nonvolatile storage medium such as a flash memory.

BACKGROUND

Recently, flash memories, a nonvolatile storage medium, are used with various electronic devices such as information processing devices including personal computers, cellphones, and digital cameras. Also, various techniques for accessing a flash memory have been proposed in the prior art (for example, Patent Literature 1).

The memory card disclosed in Patent Literature 1 comprises a flash memory and a controller controlling the flash memory, wherein the controller can receives, from an external source, a command to write data in the direction that the address increases and detects the last writing position after the writing for the received command. The controller refers to a conversion table presenting the relationship between a sector and the corresponding physical address on a flash memory and searches for the physical address corresponding to the sector (logical data) on the flash memory.

Patent Literature 1: Unexamined Japanese Patent Application Kokai Publication No. 2006-40264.

However, the conversion table designed to make the physical address on a flash memory corresponding to a sector immediately known, as in the technique disclosed in the Patent Literature 1, grows in size as the flash memory size is increased. Therefore, it is not easy to use such a conversion table in a microcomputer system requiring a smaller memory or the like as in the prior art.

SUMMARY

The present invention is invented to solve the above prior art problem and an exemplary objective of the present invention is to provide a memory controller capable of accessing the physical address corresponding to a specified sector on a readable/writable storage medium such as a flash memory at a high speed while reducing the resident memory consumption.

In order to achieve the above objective, the memory controller according to the present invention comprises:

memory control means accessing a readable/writable nonvolatile memory and reading and writing data on the basis of a sector unit of a file system established for the nonvolatile memory;

a data storage that temporarily stores an address conversion table, in which one or multiple records comprising the sector number of a sector constituting a file stored on the nonvolatile memory and the physical address on the nonvolatile memory corresponding to the sector number are registered for each file;

memory allocation means allocating a memory region on the data storage for the address conversion table corresponding to a file when a request is made to open the file from an external source;

memory release means releasing the memory region allocated by the memory allocation means at a given time; and sector number storing means storing sector numbers of at least some sectors constituting the file in each record of the address conversion table for which the memory region is allocated in sequence and notifying the memory control means accordingly after the storing, wherein:

the memory control means searches the nonvolatile memory to acquire a physical addresses corresponding to a sector number in the each record of the address conversion table and stores each acquired physical address in the corresponding record upon receiving the notification from the sector number storing means, and makes reference to the address conversion table corresponding to a file using a sector number of a sector as the key to acquire a physical address corresponding to the sector in accessing the sector constituting the file.

Advantageous Effects of Invention

The present invention makes reference to an address conversion table associating a sector number with a physical address in accessing the sector so as to immediately acquire the physical address corresponding to the sector, whereby accessing a nonvolatile memory is expedited. Furthermore, the address conversion table temporarily occupies a memory region, whereby the resident memory consumption can be reduced.

BRIEF DESCRIPTION OF DRAWINGS

FIG. 3 is an illustration schematically showing a memory structure of the flash memory in FIG. 1;

FIG. 4 is an illustration showing an example of a file system definition table;

FIG. 5 is an illustration showing an example of a conversion table management table;

FIG. 6 is an illustration showing an example of an address conversion table;

FIG. 10 is an illustration showing an example of a file system definition table used in another embodiment.

DETAILED DESCRIPTION

The memory controller according to an embodiment of the present invention will be described in detail hereafter with reference to the drawings.

Figure 1:
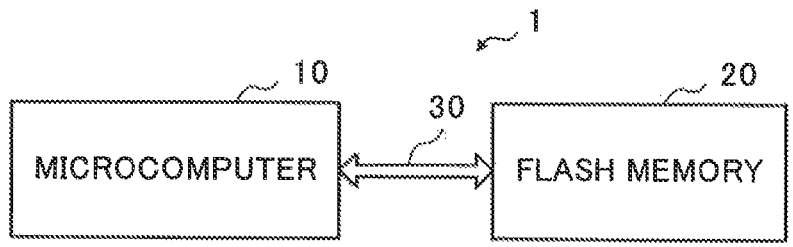
FIG. 1 is an illustration showing an entire configuration of a flash memory system comprising a microcomputer having a function of a memory controller according to an embodiment of the present invention.

FIG. 1 is an illustration showing the general configuration of a flash memory system 1 comprising a microcomputer 10 having the function of the memory controller according to this embodiment and a flash memory 20. The microcomputer 10 and flash memory 20 are connected by a data bus 30.

The microcomputer 10 is installed in various electronic devices or various electric appliances and controls the entire operation of the device. The microcomputer 10 comprises, from the viewpoint of hardware, a microprocessor, a ROM (Read Only Memory), a RAM (Random Access Memory), a memory interface, a clock source such as a quartz oscillator (none of the above is shown), and the like.

Figure 2:
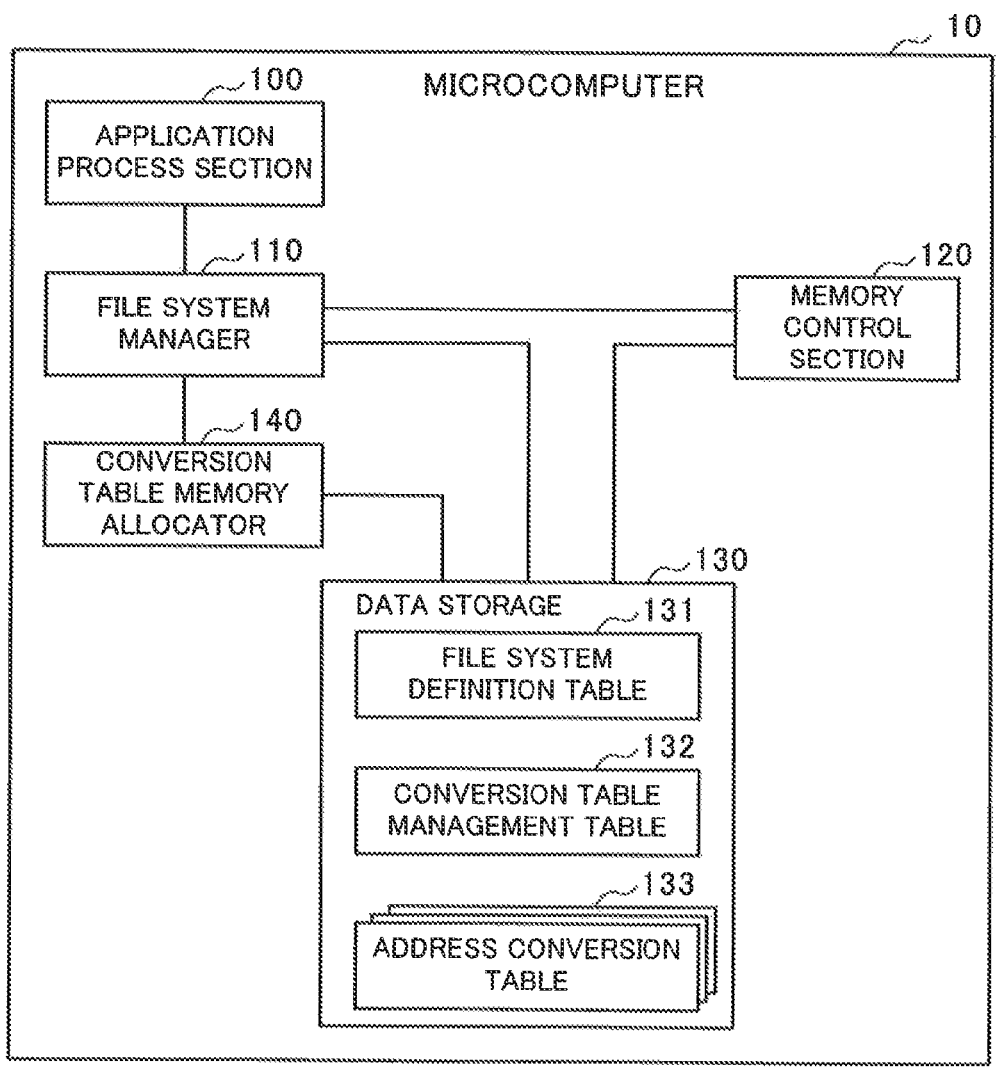
FIG. 2 is a block diagram showing a configuration of the microcomputer in FIG. 1.

The microcomputer 10 functionally comprises, as shown in FIG. 2, an application process section 100, a file system manager 110, a memory control section 120, a data storage 130, and a conversion table memory allocator 140. The file system manager 110, memory control section 120, data storage 130, and conversion table memory allocator 140 are in charge of the function of the memory controller in the present invention.

The application process section 100 executes processing according to various application software programs stored on the ROM or the like for realizing the function of the device. The file system manager 110 manages the file system established for the flash memory 20. Furthermore, the file system manager 110 is in charge of the function of sector number storing means and memory releasing means in the present invention. The memory control section 120 accesses the flash memory 20 according to a request from the application process section 100 via the file system manager 110 to execute various kinds of processing (reading data, writing data and the like).

The data storage 130 stores various tables for defining the file system. In this embodiment, the data storage 130 stores a file system definition table 131, a conversion table management table 132, an address conversion table 133, and the like. These tables will be described in detail later.

The memory region of the flash memory 20 is divided into multiple blocks as shown in FIG. 3. A block (purging block) is the unit for deleting data. A sector, which is the unit for managing data in the file system, is a division of a block divided to a given size (for example, 520 bytes), comprising a "sector number" region (for example, 4 bytes), a "sector state" region (for example, 4 bytes), and a "data" region (for example, 512 bytes).

The "sector number" region stores a number assigned to each sector (a sector number) managed by the file system. In this embodiment, serial numbers starting from 1 are assigned to the sectors.

The "sector state" region stores information indicating the usage state of the sector (sector state). With reference to the "sector state" region, it is known that the sector is in one of the states "unused," "used" and "deleted." For example, immediately after a block is purged, all sectors in the block are "unused." The "data" region stores data corresponding to the sector number stored in the "sector number" region.

For accessing data stored on the flash memory 20 and corresponding to the sector number specified by the file system manager 110, the memory control section 120 scans the memory region of the flash memory 20 on the basis of a sector unit (for example, 520 bytes) in sequence. Then, the memory control section 120 accesses the "data" region of the sector of which the "sector number" region stores the same sector number as the specified one and the "sector state" region stores information indicating "used." Furthermore, as described later, the memory control section 120 makes reference to the created address conversion table 133 using the sector number as the key to acquire the physical address corresponding to the specified sector number. Then, the memory control section 120 can immediately access the data stored on the flash memory 20 and corresponding to the specified sector number.

On the other hand, for writing new data (a file) on the flash memory 20, the memory control section 120 allocates one or multiple "unused" sectors corresponding to the data size (file size) specified by the file system manager 110 and writes the data.

Furthermore, for overwriting data, the memory control section 120 writes data and a sector number in an "unused" sector different from the "used" sector corresponding to the specified sector number and changes the sector state to "used." Furthermore, the memory control section 120 changes the sector state of the original sector to "deleted."

The file system definition table 131 comprises, as shown in FIG. 4, fields "start address," "start sector," "drive size," and the like.

The "start address" stores a first address of the memory region of the flash memory 20 (0x0000000 in this embodiment). The "start sector" stores a start sector number (1 in this embodiment). The "drive size" stores a maximum memory capacity of the flash memory 20 managed by the file system (19.2 MB (megabytes) in this embodiment).

The conversion table management table 132 is a data table presenting information regarding the address conversion tables 133 corresponding to files that are currently opened. The conversion table management table 132 comprises, as shown in FIG. 5, fields "file name," "first address," "number of records," and the like.

The "file name" stores the name of a file currently opened. The "first address" stores a memory address on the data storage 130 indicating the beginning of the corresponding address conversion table 133. The "number of records" stores the number of records of the address conversion table 133. Here, if zero is stored in the "number of records," it means that the address conversion table 133 corresponding to the file has not been created for some reason such as memory shortage. In such a case, the "first address" stores a given value "NULL."

The address conversion table 133 is a data table associating the numbers of sectors (sector numbers) constituting a file currently opened with the physical addresses on the flash memory 20. The address conversion table 133 is temporarily created for each of the currently opened files. As shown in FIG. 6, the address conversion table 133 comprises multiple records including fields "sector number" and "physical address."

The address conversion table 133 is created after a memory region corresponding to the table size is allocated on the data storage 130. The table size is determined based on the number of sectors constituting the corresponding file. More specifically, the table size is obtained by multiplying the number of sectors of the file by the record size (the size corresponding to the data type of the "sector number" (for example, 2 bytes)+ the size corresponding to the data type of the "physical address" (for example, 4 bytes)). For example, if the number of sectors is four and the record size is six bytes, the size of the memory region allocated for the address conversion table 133 is 4×6=24 bytes.

In the above case, the number of sectors constituting a file is equal to the number of records of the address conversion table 133 corresponding to the file. If the data storage 130 does not have a sufficient free region, it is possible that the number of sectors is greater than the number of records in some cases. Furthermore, the address conversion table 133 itself corresponding to the file may not be created in some cases.

The conversion table memory allocator 140 allocates a memory for the address conversion table 133 on the data storage 130 according to a request from the file system manager 110. In doing so, the file system manager 110 calculates the table size of the address conversion table 133 to allocate as described above and requests the conversion table memory allocator 140 to allocate a memory region using the table size as a parameter.

The conversion table memory allocator 140 checks on a given memory region on the data storage 130 and determines whether there is a free region of the required size. If there is a free region of the required size, the conversion table memory allocator 140 allocates a free region of the required size and returns a response message to the file system manager 110, the response message comprising a response type indicating that a memory region of the required size is allocated and a first address of the allocated memory region.

On the other hand, if there is some free region but not of the required size, the conversion table memory allocator 140 allocates a memory region of the free region size. Then, the conversion table memory allocator 140 returns a response message including the response type indicating that a memory region of the required size is not allocated, the size of the allocated memory, and the first address of the allocated memory region to the file system manager 110.

If there is no free region, the conversion table memory allocator 140 returns a response message including the response type indicating that there is no free region to the file system manager 110.

Receiving the above response message from the conversion table memory allocator 140, the file system manager 110 adds information regarding the address conversion table 133 corresponding to the file to the conversion table management table 132 (see FIG. 5). More specifically, the file system manager 110 enters a record comprising the file name of the file and the first address and number of records of the address conversion table 133 in the conversion table management table 132. Here, if some memory is allocated but the size of the allocated memory region is not of the required size, the file system manager 110 divides the size of the allocated memory region by the record size and employs the resultant quotient as the number of records in the address conversion table 133.

Furthermore, if no memory region is allocated or the size of the allocated memory region is smaller than the record size, the file system manager 110 stores NULL in the "first address" and zero in the "number of records" of the record entered in the conversion table management table 132.

After the above entry, the file system manager 110 executes the processing in sector number storing means in the present invention. In other words, the file system manager 110 stores the sector numbers of the sectors constituting the file in the "sector number" region of the records in the address conversion table 133 for which a memory region is allocated in sequence. Then, the file system manager 110 notifies the memory control section 120 of a request for the processing of filling the "physical address" region of the records in the address conversion table 133. In other words, the file system manager 110 requests the memory control section 120 to execute a procedure for searching the flash memory 20 to acquire the physical addresses corresponding to the sector numbers in the records and storing the physical addresses in the "physical address" region of the records (the physical address setting processing).

In doing so, the file system manager 110 requests the memory control section 120 to execute the physical address setting processing using the file name of the file as a parameter. Receiving the request, the memory control section 120 makes reference to the conversion table management table 132 and acquires the first address and number of records of the address conversion table 133 corresponding to the specified file name. The memory control section 120 retrieves the sector numbers in sequence starting from the first record of the address conversion table 133 based on the acquired first address and number of records.

The memory control section 120 accesses the flash memory 20 and starts scanning on the basis of a sector unit (for example, 520 bytes) downward (toward the rear blocks) from the first address (0x0000000 in this embodiment) stored in the "start address" region of the file system definition table 131 in sequence. In this scanning, the memory control section 120 searches for a sector having the same sector number and being "used." If the sector is found in the search, the memory control section 120 acquires the physical address of the sector and stores the physical address in the "physical address" region of the record in the address conversion table 133.

Figure 7:
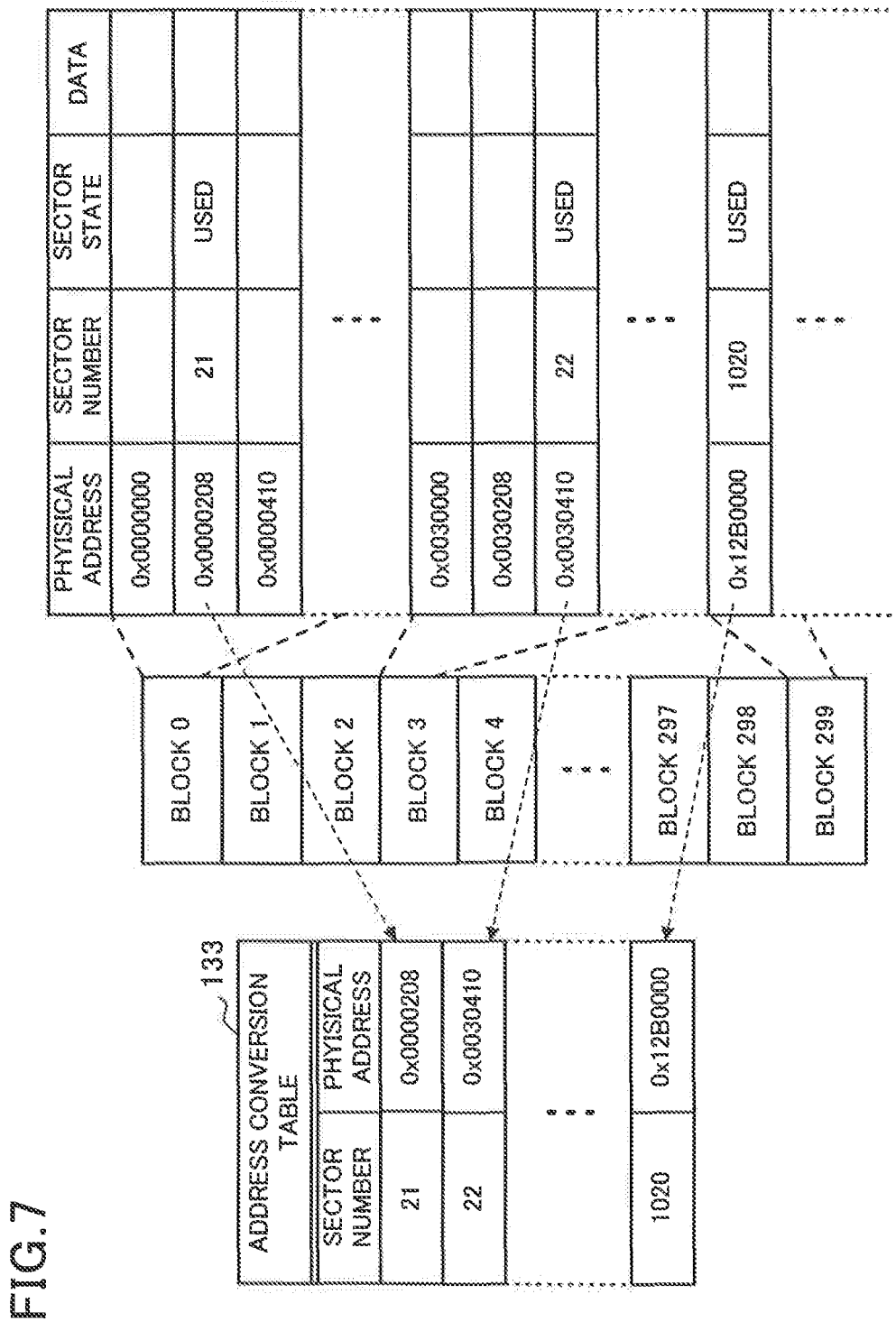
FIG. 7 is an illustration for explaining a physical address setting processing.

The memory control section 120 repeats the above processing and stores the corresponding physical addresses in all records of the address conversion table 133 as shown in FIG. 7. After the physical addresses are stored in all records, the memory control section 120 notifies the file system manager 110 of the status that the physical address setting processing ends.

The address conversion table 133 corresponding to each of the currently opened files is created as described above. As the address conversion table 133 is created, the memory control section 120 makes reference to the address conversion table 133 when the file system manager 110 makes a request for accessing (reading or the like) a sector of the file. Then, the corresponding physical address on the flash memory 20 can immediately be accessed, whereby the processing is expedited. Here, if "the total number of sectors constituting a file" is greater than "the number of records of the address conversion table 133," some sector numbers may not be stored in the address conversion table 133. In such a case, the memory control section 120 scans the memory region of the flash memory 20 on the basis of a sector unit, in sequence, in a conventional manner to access the required sector.

The created address conversion table 133 is deleted by the file system manager 110 as the corresponding file is closed. In other words, the memory region for the address conversion table 133 is released. Furthermore, the corresponding record of the conversion table management table 132 is also deleted.

If a request is made to write (overwrite) the file after the address conversion table 133 has been created, the memory control section 120 updates the physical addresses in all records of the address conversion table 133 to the physical addresses of the respective destination sectors.

Figure 8:
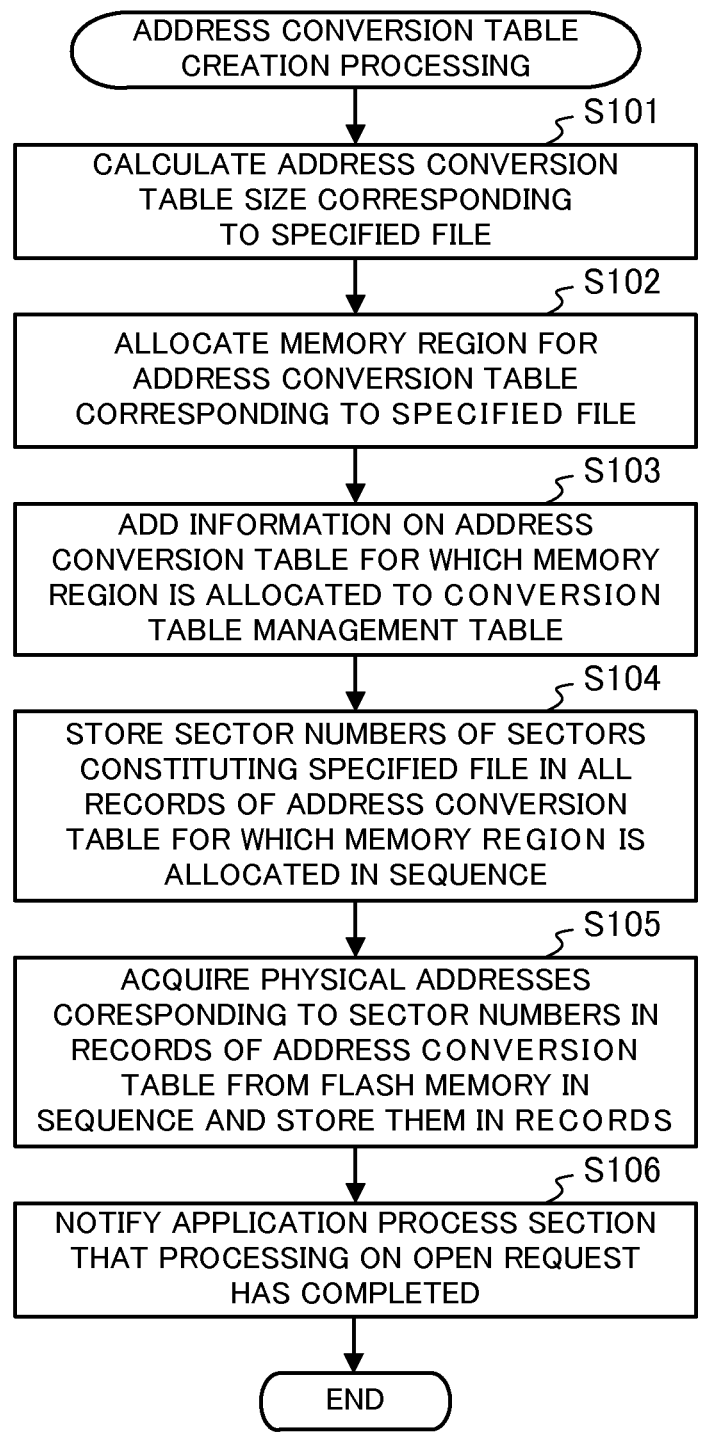
FIG. 8 is a flowchart showing a procedure of an address conversion table creation processing.

FIG. 8 is a flowchart showing a procedure of an address conversion table creation processing executed by the cooperation of the file system manager 110, conversion table memory allocator 140, and memory control section 120.

The address conversion table creation processing starts as the application process section 100 notifies the file system manager 110 of a file opening request. Here, the application process section 100 specifies the name of a file to open (a file name) in the opening request.

Receiving the file opening request from the application process section 100, the file system manager 110 makes reference to a not-shown file information table to acquire the size corresponding to the specified file name (the file size). The file information table is a table associating a file name, a file size, the numbers of the sectors (the sector numbers) constituting the file, and the like. The file information table is created when the file is written to the flash memory 20 for the first time and stored on the data storage 130.

The file system manager 110 calculates the table size of the address conversion table 133 to allocate based on the acquired file size (Step S101). Then, the file system manager 110 requests the conversion table memory allocator 140 to allocate a memory region using the table size as a parameter.

The conversion table memory allocator 140 allocates a memory region for the address conversion table 133 as described above (Step S102), and replies to the file system manager 110 with the results.

Receiving the reply, the file system manager 110 adds information regarding the address conversion table 133 corresponding to the file to the conversion table management table 132 (see FIG. 5) (Step S103).

The number of records of the address conversion table 133 added to the conversion table management table 132 is, as described above, equal to the number of sectors constituting the file if a memory region of the required table size is allocated. However, the number of records is less than the total number of all sectors if the size of the allocated memory region is smaller than the required table size. For example, if the size of the allocated memory region is 1 KB (kilobyte) and the record size of the address conversion table 133 is six bytes, the number of records is 170 (1024/6). Furthermore, if no memory is allocated or the size of the allocated memory region is smaller than the record size, zero is stored in the "number of records" region and NULL is stored in the "first address" region.

Then, the file system manager 110 stores the sector numbers of the sectors constituting the file in all records of the address conversion table 133 for which a memory region is allocated in sequence (Step S104). However, this processing is executed only when a memory region equal to or larger than one record (for example, 6 bytes) is allocated.

Then, the file system manager 110 requests the memory control section 120 to execute the physical address setting processing. However, this processing is also executed only when a memory region equal to or larger than one record is allocated like the above processing.

The memory control section 120 searches the memory region of the flash memory 20 to acquire the physical addresses corresponding to the sector numbers in all records of the address conversion table 133 and stores the physical addresses in the corresponding records (Step S105).

After completing the physical address setting processing, the memory control section 120 notifies the file system manager 110 accordingly. Receiving the notification, the file system manager 110 notifies the application process section 100 that the processing on the opening request has completed (Step S106).

The address conversion table 133 corresponding to the file requested to open is created as described above.

Figure 9:
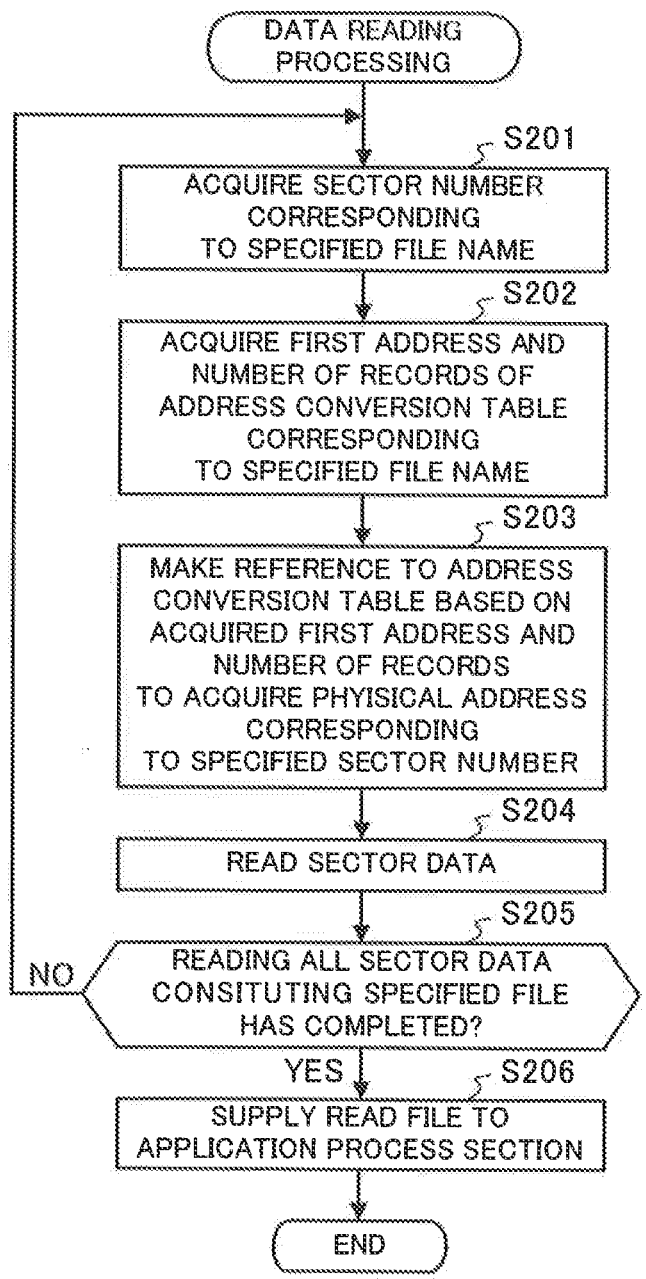
FIG. 9 is a flowchart showing a procedure of a data reading processing.

The processing executed when the application process section 100 makes a request for reading the file after the address conversion table 133 is created will be described hereafter. FIG. 9 is a flowchart showing the procedure of the data reading processing executed by the file system manager 110 and memory control section 120. The data reading processing starts as the application process section 100 notifies the file system manager 110 of a data reading request. Here, the application process section 100 specifies the name of a file to read (a file name) in the data reading request.

The file system manager 110 makes reference to the above-mentioned file information table to acquire the sector number corresponding to the specified file name (Step S201). Here, when the file comprises multiple sectors, the file system manager 110 acquires the corresponding sector numbers one at a time in sequence with reference to the file information table.

The file system manager 110 notifies the memory control section 120 of the acquired sector number and the file name of the file, and requests the memory control section 120 to read the data corresponding to the sector.

Receiving the request, the memory control section 120 makes reference to the conversion table management table 132 to acquire the first address and number of records of the address conversion table 133 corresponding to the specified file name (Step S202). The memory control section 120 checks on the value stored in the "sector number" region in sequence starting from the first record of the address conversion table 133 based on the acquired first address and number of records, and searches for the record where the specified sector number is stored. Then, the memory control section 120 acquires the physical address stored in the "physical address" region of the record (Step S203).

The memory control section 120 accesses the sector located at the acquired physical address on the flash memory 20 and reads the data stored in the "data" region (sector data) (Step S204). The memory control section 120 supplies the read sector data to the file system manager 110 and notifies the file system manager 110 that reading the sector data has completed. Receiving the notification, the file system manager 110 determines whether reading all sector data constituting the file has completed (Step S205).

If reading all sector data has not completed (Step S205; NO), the above processing is repeatedly executed. In other words, the file system manager 110 makes reference to the file information table to acquire the next corresponding sector number (Step S201). Then, the file system manager 110 notifies the memory control section 120 of the acquired sector number and the file name of the file, and requests the memory control section 120 to read the data corresponding to the sector. Receiving the request, the memory control section 120 executes the processing in the above Steps S202 to S204.

On the other hand, after reading all sector data has completed (Step S205; YES), the file system manager 110 supplies all read sector data, namely the read file, to the application process section 100 (Step S206), and the processing ends.

As described above, when a file is opened, the microcomputer 10 (memory controller) in this embodiment creates an address conversion table 133 associating the numbers of the sectors constituting the file with the physical addresses on the flash memory 20. Then, when a request is made to read the file or the like while the file is opened, the sector stored on the flash memory 20 and corresponding to the specified sector number can immediately be accessed by making reference to the address conversion table 133. Then, the processing is expedited.

Furthermore, the memory region for the address conversion table 133 is allocated when a file is opened and released when the file is closed. Therefore, the table is not normally present on the data storage 130 and the memory region is temporarily occupied. Therefore, the resident memory consumption can be reduced.

The present invention is not confined to the above embodiment and various changes can be made without departing from the gist of the present invention.

For example, in the above embodiment, the memory region allocated for the address conversion table 133 is released when the corresponding file is closed. However, the time to release the memory region is not limited thereto. For example, the memory region may be released after a given time period has elapsed since the allocation. In this way, a single memory region allocated for the address conversion table 133 is not occupied for a prolonged time.

Furthermore, in the above embodiment, the conversion table memory allocator 140 allocates a memory region of the required size if a free region of the required size is available on the data storage 130. The way of allocating a memory region is not limited thereto. For example, a memory region may be allocated in consideration of files to be opened later. More specifically, in such a case, as shown in FIG. 10, the file system definition table 131 additionally comprises fields "number of open reservations" and "reservation size."

The "number of open reservations" field stores a predicted number of files opened simultaneously. "The files opened simultaneously" means that a file is opened and another file is opened before the one file is closed. The predicted number can be a predetermined fixed value or a value updated as appropriate such as the average or maximum number of files opened simultaneously in the past.

Furthermore, the "reservation size" field stores the minimum size guaranteed to be allocated for an address conversion table 133 even if files as many as the number stored in the "number of opening reservations" field are opened simultaneously. The size can be a fixed value or a value updated as appropriate such as the average or maximum value of the sizes of the address conversion tables 133 created in the past.

In the above case, receiving a memory region allocating request from the file system manager 110, the conversion table memory allocator 140 determines the maximum allocable memory region size based on the free region size on the data storage 130, the values stored in the "number of open reservations" field and "reservation size" field of the file system definition table 131, and the number of currently opened files.

For example, if the "number of open reservations" is eight and two files are currently opened including itself, six more files can be opened later. In such a case, if the "reservation size" is 60 B (bytes), the maximum size allocable for the address conversion table 133 is determined by subtracting 360 B (6.times.60 B) from the free region size.

In this way, even if multiple files are opened simultaneously, the problem that the address conversion table 133 cannot be created for a file requested to open later because of memory shortage can be prevented. Then, the file requested to open later is prevented from significantly slowing down in processing.

Furthermore, it is possible that the application process section 100 is able to specify the priority of a file to open and the maximum allocable memory region size is determined according to the priority. In such a case, for example, the conversion table memory allocator 140 allocates a memory region of the required size for a high-priority file if there is a free region of the required size on the data storage 130. On the other hand, the conversion table memory allocator 140 allocates a memory region of a given size smaller than the required size (for example, a size stored in the "reservation size" field) for a low-priority file even if there is a free region of the required size on the data storage 130.

In this way, the address conversion table 133 of a desired size can be created for a high-priority file (for example, a file with which a reading request or the like is often issued while the file is opened), whereby the processing is efficiently expedited.

Various embodiments and modifications are available to the present invention without departing from the broad sense of spirit and scope of the present invention. The above-described embodiment is given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

INDUSTRIAL APPLICABILITY

The present invention can preferably be used in various electronic devices using readable/writable storage media such as flash memories.

The invention claimed is:

1. A memory controller, comprising:
a memory control section that accesses a readable/writable nonvolatile memory and reads and writes data on the basis of a sector unit of a file system established for the nonvolatile memory;
a data storage that temporarily stores an address conversion table for each file;
a memory allocator that allocates a memory region on the data storage for the address conversion table corresponding to a file when a request is made to open the file from an external source;
a memory releaser that releases the memory region for the address conversion table allocated by the memory allocator at a given time; and
a sector number storer that sequentially stores sector numbers of at least some sectors constituting the file in each record of the address conversion table for which the memory region for the address conversion table is allocated and notifies the memory control section accordingly after the storing, wherein:
the memory control section searches the nonvolatile memory to acquire a physical address corresponding to a sector number in each record of the address conversion table and stores each acquired physical address in the corresponding record upon receiving the notification from the sector number storer, and
makes reference to the address conversion table corresponding to a file using a sector number of a sector as the key to acquire a physical address corresponding to the sector in accessing the sector constituting the file.

2. The memory controller according to claim 1, wherein the memory releaser releases the memory region for the address conversion table corresponding to a file when a request is made to close the file.

3. The memory controller according to claim 1, wherein the memory releaser releases the memory region for the address conversion table after a given time period has elapsed since the memory region was allocated.

4. The memory controller according to claim 1, wherein the sector number storer stores the sector numbers of all sectors constituting a file in the address conversion table when the number of records of the address conversion table developed on the memory region allocated by the memory allocator is equal to or greater than the total number of sectors constituting the file.

5. The memory controller according to claim 1, wherein when there is a free region equivalent to a memory region for the address conversion table corresponding to the total number of sectors constituting the file in a given memory region of the data storage, the memory allocator allocates the free region for the memory region for the address conversion table.

6. The memory controller according to claim 1, wherein the memory allocator allocates a memory region for the address conversion table in consideration of the number of files to be opened later.

7. The memory controller according to claim 1, wherein the file is given a given priority, and
the memory allocator allocates a memory region for the address conversion table in consideration of the priority of a file requested to be opened.

8. A memory access method, comprising:
a memory control step that accesses a readable/writable nonvolatile memory and reads and writes data on the basis of a sector unit of a file system established for the nonvolatile memory;
a memory allocation step that allocates a memory region on a data storage for an address conversion table corresponding to a file when a request is made to open the file from an external source;
a memory release step that releases the memory region for the address conversion table allocated in the memory allocation step at a given time; and
a sector number storing step that sequentially stores sector numbers of at least some sectors constituting the file in each record of the address conversion table for which the memory region for the address conversion table is allocated,
wherein in the memory control step,
after the sector number storing step, a physical address corresponding to a sector number in each record of the address conversion table is acquired by searching the nonvolatile memory and each acquired physical address is stored in the corresponding record, and
in accessing a sector constituting a file, the physical address corresponding to the sector is acquired by making reference to the address conversion table corresponding to the file using the sector number of the sector as the key.

* * * * *